United States Patent [19]

Rescigno

[11] Patent Number: 5,346,336

[45] Date of Patent: Sep. 13, 1994

[54] METAL-CUTTING INSERT HAVING A ROUND CUTTING EDGE

[75] Inventor: Pasquale F. Rescigno, West Paterson, N.J.

[73] Assignee: Sandvik, Inc., Fair Lawn, N.J.

[21] Appl. No.: 971,216

[22] Filed: Nov. 4, 1992

[51] Int. Cl.$^5$ .................. B23B 27/08; B23B 27/06
[52] U.S. Cl. .................... 407/104; 407/64; 407/113
[58] Field of Search ............. 407/101, 102, 103, 104, 407/106, 99, 113, 114, 115, 64, 65, 66, 47

[56] References Cited

U.S. PATENT DOCUMENTS

| | | | |
|---|---|---|---|
| 1,542,007 | 6/1925 | Schroeder | 407/113 |
| 1,838,520 | 12/1931 | Archer | 407/99 |
| 4,273,479 | 6/1981 | Raupp, Jr. et al. | 407/113 |
| 4,294,565 | 10/1981 | Erkfritz | 407/113 |
| 4,552,491 | 11/1985 | Parker | 407/113 |
| 4,632,593 | 12/1986 | Stashko | 407/104 |
| 4,812,087 | 3/1989 | Stashko | 407/113 |
| 5,076,738 | 12/1991 | Pano et al. | 407/102 |
| 5,145,294 | 9/1992 | Flueckiger | 407/113 |

FOREIGN PATENT DOCUMENTS

| | | |
|---|---|---|
| 0307949 | 3/1989 | European Pat. Off. |
| 3642514 | 6/1988 | Fed. Rep. of Germany |
| 671005 | 4/1952 | United Kingdom ........ 407/103 |

Primary Examiner—William E. Terrell
Attorney, Agent, or Firm—Burns, Doane, Swecker & Mathis

[57] ABSTRACT

A metal cutting insert comprises a top surface which is intersected by a frusto-conical edge surface to form therewith a round cutting edge. Five equidistantly spaced flat facets are formed in the edge surface. Upper ends of the facets are spaced below the cutting edge. A fixing screw secures the insert to the seat of a holder, such that two of the facets are pressed against respective flat contact areas formed on a locating surface of the holder. Each facet forms an acute angle relative to a central axis of the insert.

8 Claims, 1 Drawing Sheet

METAL-CUTTING INSERT HAVING A ROUND CUTTING EDGE

BACKGROUND OF THE INVENTION

The present invention relates to metal cutting inserts having a round cutting edge.

Cutting inserts are conventional which possess a top (chipbreaking) surface and a frusto-conical edge (clearance) surface which intersects the top surface to form therewith a round cutting edge. Such inserts, usually formed of a cemented carbide, are used in copy turning operations and making rounded fillets. A central through-hole in the insert receives a fixing screw which is connectible to a threaded hole in a holder to anchor the insert in place. The holder defines a tip seat or pocket in which the insert is received. The pocket includes an upstanding locating wall which is generally V-shaped when viewed in plan, whereby the frusto-conical edge surface makes contact with that locating wall at two locations. During a cutting operation, only a portion of the round cutting edge actually cuts the workpiece. When that portion is worn, the insert is indexed to present a fresh portion of the cutting edge for cutting. It is important that, during the cutting operation, the insert remain fixed against rotation (slippage) about its center axis relative to the holder. However, due to the curvature of the edge surface of the insert, such slippage may occur, despite being pressed tightly against the locating wall by the fixing screw. It is a goal of the present invention to prevent such slippage without weakening the cutting edge.

In Raupp, Jr. et al U.S. Pat. No. 4,273,479, an indexable broaching insert is described which includes a cylindrical edge surface that intersects a top (clearance) surface to form a round cutting edge. The cylindrical surface includes four equi-spaced flats which make engagement with a locating wall for resisting slippage of the broaching insert during cutting. The flats are oriented parallel to the center axis of the insert and intersect the cutting edge to convert what would otherwise be a round cutting edge into a polygonal cutting edge. Such a polygonal cutting edge, however, would not be suitable for copy turning and fillet making.

SUMMARY OF THE INVENTION

The present invention relates to a metal cutting insert per se, and to such an insert in combination with a holder.

The cutting insert comprises a top chipbreaking surface, a bottom mounting surface, and a generally frusto-conical edge clearance surface extending between the top and bottom surfaces. The edge surface intersects the top surface to form therewith a round cutting edge. A plurality of circumferentially spaced flat facets are formed in the edge surface. Upper ends of the facets are spaced below the cutting edge. Each facet is inclined at an acute angle relative to a center axis of the insert.

Preferably, each facet has a height which is no greater than about 50–70 percent, preferably 60 percent, of a height of the insert.

Preferably, the acute angle is from about 10° to about 20°, most preferably about 15°.

There are preferably about five facets spaced equidistantly apart.

The insert preferably includes a central through-hole for receiving a fixing fastener that secures the insert to the holder.

The top surface of the insert preferably includes a round land situated radially inwardly of the cutting edge.

The holder includes a seating surface for supporting the insert, and an upstanding wall having a locating surface. The locating surface is inclined at about the same angle as the acute angle of the facets. The locating surface includes first and second flat contact areas which form an obtuse angle therebetween. Those contact areas are contacted by two of the facets. A fixing screw secures the insert to the holder and presses the two facets against the contact areas.

BRIEF DESCRIPTION OF THE DRAWING

The objects and advantages of the invention will become apparent from the following detailed description of a preferred embodiment thereof in connection with the accompanying drawings in which like numerals designate like elements, and in which.

DETAILED DESCRIPTION OF A PREFERRED EMBODIMENT OF THE INVENTION

Figure 1:
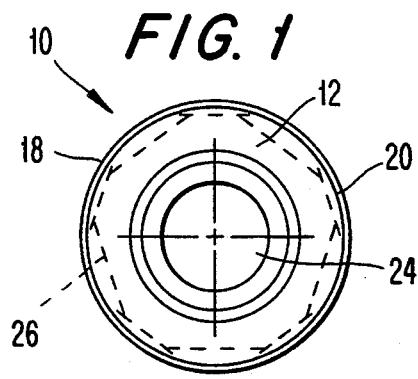
FIG. 1 is a top plan view of a metal cutting insert according to the present invention.

A turning insert 10 comprises a top face 12, a bottom supporting surface 14, and a frusto-conical edge surface 16. The top surface acts as a chipbreaking surface. The intersection of the top surface and edge surface defines a round cutting edge 18. A round land 20 is situated inside of the cutting edge 18. The center portion of the top surface is recessed with respect to the land 20. A through-hole 24 extends centrally through that center portion for receiving a fixing screw.

The edge surface 16 is inclined at an acute angle A relative to a line parallel to the center axis 25 of the insert, and thus is inclined at that same angle relative to the axis itself. That angle A is preferably about 7°.

Formed in the edge surface 16 is a plurality of facets, i.e., planar surfaces 26 which extend from the bottom surface toward the top surface. There are preferably five identical and equidistantly spaced facets. Each facet forms an angle B relative to a line extending parallel to the central axis 25 and thus forms the angle B relative to the axis 25 itself. The angle B is preferably in the range of 10°–20°, most preferably about 15°. The height H' of each facet 27 is about 50 to 70 percent of the height H of the insert, most preferably about 60 percent. Thus, the facets terminate short of (i.e., below) the cutting edge 18 so that the cutting edge remains round, and so that sufficient material remains disposed below the cutting edge to reinforce the latter.

Figure 4:
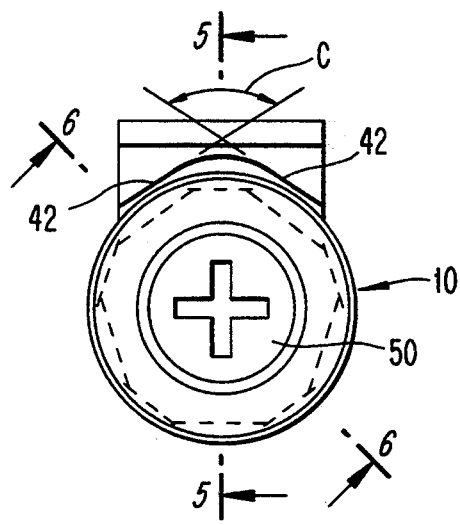
FIG. 4 is a top plan view of an insert mounted in a holder.
Figure 2:
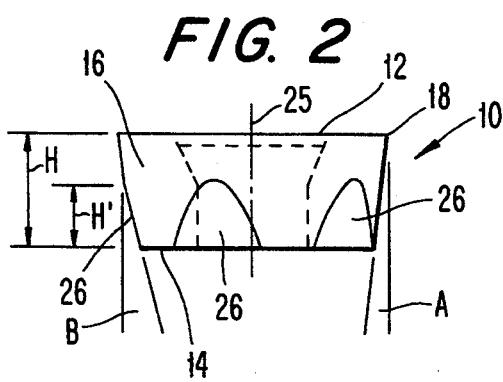
FIG. 2 is a side elevational view of the insert depicted in FIG. 1.
Figure 5:
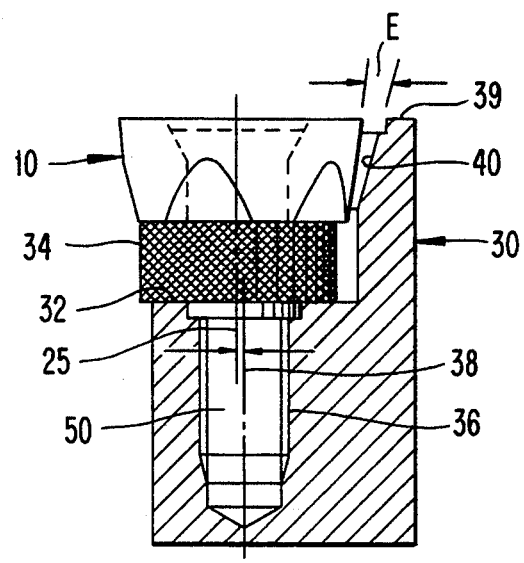
FIG. 5 is a cross-sectional view taken along the line 5—5 in FIG. 4.
Figure 3:
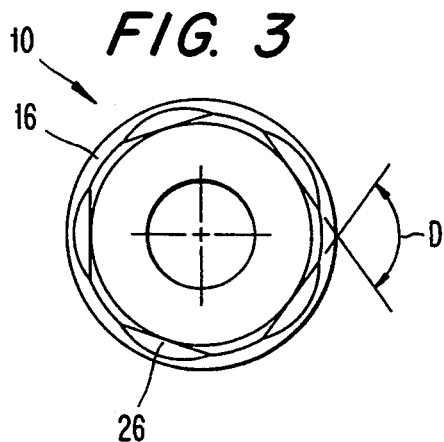
FIG. 3 is a bottom plan view of the insert depicted in FIG. 1.
Figure 6:
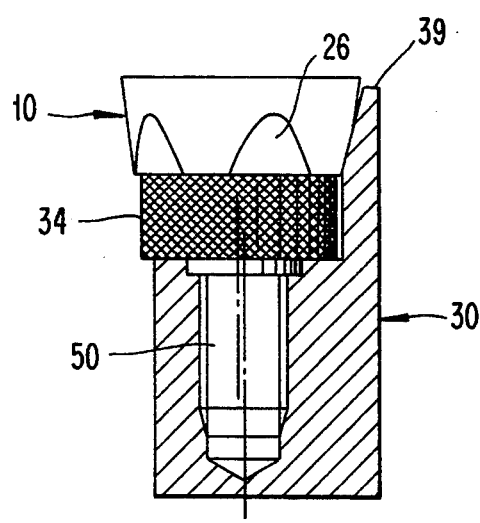
FIG. 6 is a cross-sectional view taken along the line 6—6 in FIG. 4.

The insert 10 is to be mounted in a pocket of a holder 30. The pocket has a seating surface 32 on which a shim 34 rests, with the insert 10 seated on the shim 34. A receiving hole 36 extends into the seating surface 32 and defines a center axis 38. An upstanding wall 39 extends from the seating surface 32 and includes a locating surface 40. The locating surface 40 is generally V-shaped as viewed in plan (see FIG. 4) in that it is formed by two flat contact areas or sides 42 that form an obtuse angle C therebetween which is preferably about 108°. That angle C corresponds substantially to an angle D formed between two successive facets of the insert (see FIG. 3).

Each side 40 forms an angle E relative to the axis 38 which is slightly smaller (e.g., by about 20') than the angle B to ensure that initial contact between the insert and locating wall occurs adjacent the upper end of the facet rather than at the lower end thereof (which could cause the insert to break). Since the insert is formed of a harder material than the holder, the upper end of the facet will eventually be pressed into the softer locating surface to achieve a flush surface-to-surface contact therebetween.

It will be appreciated that when an insert 10 is seated on the shim 34 and is pressed against the locating surface 40 such that two flat facets 26 contact respective ones of the flat sides 42, slippage of the insert will be effectively resisted during cutting, i.e., rotation of the insert about its axis 25 will be resisted.

In order to ensue that the insert is pressed firmly against the locating surface 40, the axis 38 of the hole 36 is (as is conventional) offset very slightly relative to the axis 25 of the insert through-hole, so that the fixing screw 50 will be offset by that amount toward the locating surface 40. Hence, the fixing screw will tend to push the insert against the locating surface.

It will be appreciated that the faceted insert according to the present invention effectively resists slippage of the insert during cutting while presenting a round cutting edge 18 which is amply reinforced from below.

Although the present invention has been described in connection with a preferred embodiment thereof, it will be appreciated by those skilled in the art that additions, modifications, substitutions, and deletions not specifically described may be made without departing from the spirit and scope of the invention as defined in the appended claims.

What is claimed is:

1. An indexable metal-turning insert comprising:
   a top chipbreaking surface;
   a bottom mounting surface;
   a frusto-conical clearance surface extending between said top and bottom surfaces and intersecting said top surface to form therewith a round cutting edge, said clearance surface having a circumference; and
   a plurality of circumferentially spaced flat facets formed in said clearance surface, upper ends of said facets being spaced below said cutting edge, each facet being inclined at an acute angle relative to a center axis of the metal-turning insert, each facet having a height no greater than fifty to seventy percent of a height of said metal-turning insert.

2. A metal-cutting insert according to claim 1, wherein said height of each facet is about sixty percent of said height of said insert.

3. A metal-cutting insert according to claim 1, wherein said acute angle is from about ten to about twenty degrees.

4. A metal-cutting insert according to claim 3, wherein said acute angle is about fifteen degrees.

5. A metal-cutting insert according to claim 1, wherein said clearance surface has a circumference, there being five said facets spaced equidistantly circumferentially apart.

6. A metal-cutting insert according to claim 1, wherein said top surface includes a round land situated radially inwardly of said cutting edge.

7. A metal-cutting insert according to claim 1, wherein said insert includes a central through-hole for receiving a fixing fastener.

8. In combination, an indexable metal-turning insert, a holder for said metal-turning insert, and a fixing screw; said metal-turning insert comprising:
   a top chipbreaking surface,
   a bottom mounting surface,
   a frusto-conical clearance surface extending between said top and bottom surfaces and intersecting said top surface to form therewith a round cutting edge, and
   a plurality of circumferentially spaced flat facets formed in said clearance surface, upper ends of said facets being spaced below said cutting edge, each facet being inclined at an acute angle relative to a central axis of the metal-turning insert, each facet having a height no greater than about fifty to seventy percent of a height of said metal-turning insert;

said holder including a seating surface for supporting the turning insert, and an upstanding wall having a locating surface, said locating surface being inclined at an angle corresponding to said acute angle, and including first and second flat contact areas forming an obtuse angle therebetween, said first and second contact areas being contacted by two of said facets, respectively; and said fixing screw extending through a through-hole of said turning insert and connected to a hole in said seating surface for pressing said insert toward said seating surface and pressing said two facets against said contact areas.

* * * * *